United States Patent [19]

Pennock

[11] 4,236,721

[45] Dec. 2, 1980

[54] SEALING BUSHING

[75] Inventor: Theodorus A. F. Pennock, The Hague, Netherlands

[73] Assignee: B.V. Neratoom, The Hague, Netherlands

[21] Appl. No.: 14,325

[22] Filed: Feb. 22, 1979

[30] Foreign Application Priority Data

Mar. 1, 1978 [NL] Netherlands ......................... 7802284

[51] Int. Cl.² ............................................. F16J 15/42
[52] U.S. Cl. .................................... 277/14 V; 277/135
[58] Field of Search .................... 277/13, 14 R, 14 V, 277/135, 237 R, 3, 27

[56] References Cited

U.S. PATENT DOCUMENTS

| | | | |
|---|---|---|---|
| 2,002,918 | 5/1935 | Mendenhall et al. | 277/14 V |
| 2,795,195 | 6/1957 | Amblard et al. | 277/135 X |
| 3,186,345 | 6/1965 | Ivanoff | 277/14 V X |

FOREIGN PATENT DOCUMENTS

| | | | |
|---|---|---|---|
| 891725 | 12/1943 | France | 277/135 |
| 1181699 | 1/1959 | France | 277/14 V |
| 520039 | 4/1940 | United Kingdom | 277/13 |
| 533384 | 2/1941 | United Kingdom | 277/135 |
| 691414 | 5/1953 | United Kingdom | 277/135 |
| 916150 | 1/1963 | United Kingdom | 277/14 V |

Primary Examiner—Robert S. Ward, Jr.
Attorney, Agent, or Firm—Kenyon & Kenyon

[57] ABSTRACT

A sealing bushing for a member rotatable about a vertical axis and extending through a wall of a housing, which bushing comprises a sleeve fixedly connected to the wall of the housing and a sleeve fixedly connected to the shaft of the rotatable member. The last-named sleeve is concentrically received in the first-named sleeve. The bushing further comprises means for maintaining a sealing liquid in the clearance between the sleeves, which clearance opens at its top into a space in which a movable member is mounted that, when urged upwards by the sealing liquid, seals a clearance between the sleeve connected to the shaft and the housing.

9 Claims, 5 Drawing Figures

SEALING BUSHING

The invention relates to a sealing bushing for a member rotatable about a vertical axis and extending through a wall of a housing, which bushing comprises a fixed sleeve connected to the wall, a shaft of the rotatable member extending concentrically through the sleeve, and a rotatable sleeve having its upper end fixedly connected to the shaft, the rotatable sleeve being concentrically received in the fixed sleeve connected to the wall, the connection between the upper end of the rotatable sleeve connected to the shaft and the shaft being impermeable to liquid and gas, the sleeve connected to the shaft and the fixed sleeve connected to the wall being dimensioned to define a small clearance between them, and means for maintaining a sealing liquid under pressure to a desired level in the small clearance during the rotation of the member.

Such a device is known, for example, from Dutch patent application No. 7017502 and is described therein especially with reference to FIG. 3. The seal in question is intended for sealing the shaft of an agitating means in a hydrogenation vessel against hydrogen gas.

Sealing bushings can be used in a great variety of devices. For example, a sealing bushing may suitably be applied to the pump used in the sodium circuit of a sodium-cooled fast breeding reactor. As soon as the shaft of the pump commences to rotate, sealing liquid that would normally tend to flow in a direction out of the bushing is forced back to the interior thereof in known per se manner, for example, by means of helices on the shaft. When the shaft is at rest, however, there is danger of the sealing liquid leaking out of the bushing. Especially in the case of a sodium pump, in the housing of which sodium is positioned below a blanket of inert gas having a pressure higher than the ambient pressure, in the rest condition of the shaft the sealing liquid tends to emerge from the top of the bushing and hence to escape from the pump housing, which could lead to the subsequent escape of the inert gas of the gas blanket. Of course, the release of such gas in the ambient atmosphere is undesirable ipso facto, but it is all the more undesirable if the primary circuit of the sodium system of a nuclear reactor is concerned, as the gas in such a circuit may be radioactive.

It is an object of the invention to provide a sealing bushing of the above type, which bushing includes means to ensure that in the rest condition of the shaft absolutely no sealing liquid emerges from the housing. In accordance with the invention, this object is achieved by means of a bushing in which the sleeves and the wall of the housing are designed so that the small clearance opens adjacent its top end into a space in which a movable sealing member is mounted, above this space there being a second small clearance between the sleeve connected to the shaft and the wall of the housing, which clearance can be sealed by the movable sealing member.

The sealing bushing according to the invention thus includes an annular chamber adjacent the upper end of the clearance between the stationary and the rotary component, which annular chamber accommodates a sealing member that will generally be annular too. In the rest condition of the device (e.g. pump) in which the bushing is included, the sealing liquid will be urged upwardly in the clearance if there is over-pressure in the device, and when entering into the annular chamber the sealing liquid will urge the sealing member upward so that this member seals the clearance between the stationary and the rotary component above the annular chamber.

In a suitable embodiment of the bushing according to the invention, the sealing member is an internally hollow float member having a sealing ring secured thereon, which ring is positioned directly opposite the second small clearance. Preferably, the float member of the sealing member has an open bottom. In such a structure, the interior pressure on the wall of the float member is equal to the exterior pressure thereon, so that this wall may be extremely light. Furthermore, in this embodiment the float member will not collapse in calamity situations in which the gas pressure under the seal exceeds the pressure head of the dynamic liquid seal and hence urges the sealing liquid upwards.

The sealing ring of the sealing member may be conveniently made of rubber, while the float member may be of a light metal, such as aluminum. It is possible, however, to use other materials for ring and float member. The sealing ring may further be designed so that, when the sealing member is urged upwards, the ring is pressed against the top wall of the chamber on both sides of the second small clearance. Moreover, the sealing ring may have such a shape that, when the sealing member is urged upwards, this ring is pressed more or less into and against the second small clearance.

When re-starting the rotation of the rotary member, due to the pumping action of the liquid seal the liquid under the sealing member is pumped down, so that this member is automatically released from the rotating component and settles on the bottom of the chamber. To prevent the sealing member from rotating during the re-starting of the rotary member and during possible calamities, the sealing ring may be provided with a laterally outwardly projecting flap of rubber or some other flexible sealing material, which flap is fixedly connected to the wall or between wall sections of the housing and the sleeve connected thereto. An advantage inherent in such a structure is that the sealing ring and the float member are centered and cannot rotate, while furthermore a possible passage for the sealing liquid is sealed. Of course, the flap should be flexible so that the vertical movement of the sealing member is not essentially affected thereby.

In a further embodiment of the sealing bushing according to the invention, the sealing member is a flat, annular flap of flexible sealing material, which flap has its outer circumference fixedly connected between wall sections or to the wall of the housing and the sleeve connected thereto, and has its inner circumference provided with a sealing ring opposite the second small clearance. Flap and ring may be made of, for example, rubber. In such a structure, in the rest condition of the device the gas of the ambient atmosphere, which gas is present above the sealing liquid in the small clearance, in the space around the sealing member, and in the second small clearance, cannot escape from under the flap with the ring as soon as the sealing liquid is urged upwards and reaches the bottom of the sealing ring. Upon a further supply of sealing liquid, the entrapped gas will be compressed and will thus urge the flap with the ring upwards so that the ring seals the second small clearance. Even if, during prolonged rest periods of the device, the pressure of the sealing liquid would cause the gas under the flap to diffuse outwards through the flap into the second small clearance, the seal remains fully effective as then the sealing liquid takes the place of the gas and maintains the required upward pressure.

The sealing bushing according to the invention operates fully automatically, both in the rest condition of the device and in the event of possible calamities. The combination of the movable sealing member and the liquid seal further ensures a completely gas-tight seal.

The invention will now be elucidated with reference to the accompanying drawings, in which:

FIG. 1 schematically shows a cross-sectional view of an embodiment of the sealing bushing according to the invention;

Figure 1:
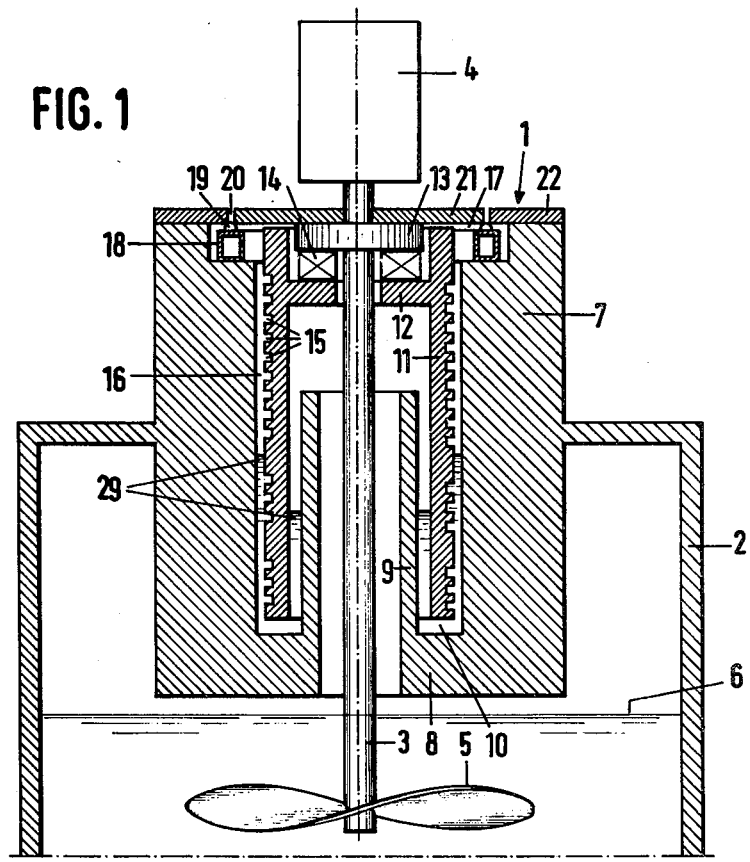

FIG. 1 schematically shows an embodiment of the sealing bushing according to the invention. The bushing, generally designated by reference numeral 1, is secured in the upper section of a housing or vessel 2. Into vessel 2 there extends, for example, the shaft 3 of a pump or some other component to be rotated. In the schematically shown embodiment a pump is chosen by way of example. Shaft 3 has its upper end outside vessel 2 connected to a drive motor 4 and has its lower end in vessel 2 provided with pump vanes 5. Self-evidently, components 4 and 5 are not essential features of the present invention. Shaft 3 may further be suitably bearing-mounted, for example by bearings (not shown) adjacent motor 4 and adjacent vanes 5. Vessel 2 contains a liquid, for example liquid sodium, the level of which is designated by reference numeral 6. A blanket of an inert gas is situated on top of the liquid. The pressure of the gas of this blanket is higher than the pressure of the ambient atmosphere outside vessel 2.

Bushing 1 comprises a tubular member or first sleeve 7 fixedly secured to vessel 2 in a covenient manner. Sleeve 7 has its lower end provided with a flange 8 directed towards the shaft, on which flange 8 an upwardly directed second fixed sleeve 9 is secured that is coaxial with and spaced from the first fixed sleeve 7 so that a cylindrical space 10 is defined by sleeve 9 and sleeve or member 7. A rotatable sleeve 11 coaxial with fixed sleeves 7 and 9 is received in space 10. Sleeve 11 is provided with an inwardly directed flange 12 adjacent its upper end. Shaft 3 is provided with a flange 13 adjacent the upper end of bushing 1. Flange 12 of sleeve 11 is fixedly connected to flange 13 of shaft 3 by means of a ring 14 of suitable material. A rotation of shaft 3 will therefore cause rotation of sleeve 11. A sealing liquid 29, for example oil, is contained in space 10 and in the lower portion of the clearances between sleeves 7 and 11 and sleeves 11 and 9 respectively.

The outer circumferential surface of rotatable sleeve 11 is provided with a number of helical grooves 15 formed so that the rotation of sleeve 11 causes the establishment of a pressure head in the sealing liquid 29 present in the small clearance 16 between sleeve 11 and sleeve or member 7, so that no gas can escape through this clearance 16. When sleeve 11 is at rest, the pump action of the helical grooves 15 is absent, and the sealing liquid can be urged upwards in the small clearance 16 by the pressure of the gas present in vessel 2 above liquid level 6. To prevent the sealing liquid 29 from being forced out of bushing 1, a suitably shaped space 17 accommodating a sealing member 18 is provided adjacent the upper end of the small clearance 16 between sleeve 11 and sleeve or member 7. In the embodiment shown, sealing member 18 is a hollow, annular member having a ring 19 of, for example, rubber provided on its upper surface. When the sealing liquid 29 moves upwards through clearance 16 to enter into space 17, sealing member 18 will start to float on the liquid and will thus be moved upwards until the ring 19 hermetically seals the small clearance 20 between the cover plate 22 secured on sleeve 7 and a flat annular cover plate 21 secured on flange 13 to surround shaft 3.

Figure 2:
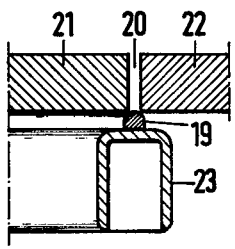
FIG. 2 shows a cross-sectional view of a section of another embodiment of the sealing member to be used in the bushing according to the invention.

FIG. 2 shows a cross-sectional view of a further embodiment of the sealing member accommodated in space 17 in FIG. 1. This embodiment includes a bottomless, annular hollow body 23 on which the ring 19 is mounted. As shown, ring 19 hermetically seals the clearance 20 between plates 21 and 22.

Figure 3:
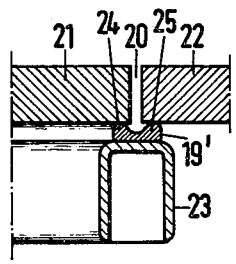
FIG. 3 shows, in a manner similar to FIG. 2, yet another embodiment of the sealing member.

FIG. 3 shows a cross-sectional view of a portion of yet another embodiment of the sealing member. In this embodiment, ring 19 on the bottomless hollow member 23 is provided with two concentric annular ridges 24 and 25. When the sealing member is moved upwards, ridge 24 is urged against the bottom of plate 21 and ridge 25 is urged against the bottom of plate 22, so that no gas or liquid can escape through the small clearance 20 between plates 21 and 22 in this embodiment either.

Figure 4:
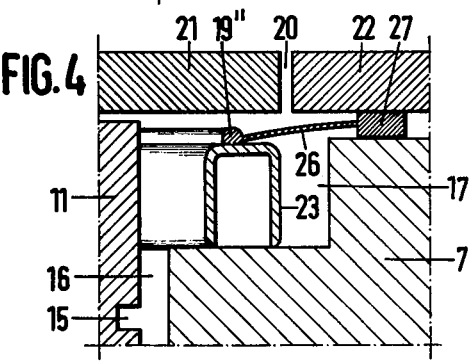
FIG. 4 shows a cross-sectional view of the relevant section of the bushing according to the invention including a sealing member having an annular flap.

FIG. 4 shows a cross-sectional view of a portion of the bushing according to the invention including a sealing member having an annular flap. Just as in the embodiment shown in FIG. 2, the sealing member in space 17 above the small clearance 16 between sleeve 11 and member 7 is a hollow, bottomless annular member 23 of suitable material, for example aluminum. A ring 19″ of, for example, rubber is secured on member 23. This ring 19″ includes an outwardly extending annular flap 26 of flexible sealing material, for example, rubber. Flap 26 has its outer circumference provided with, or flap 26 ends in, a ring 27 clamped between the suitably shaped upper surface of member 7 and the plate 22. When in the rest condition of the device the member 23 is moved upwards, ring 19″ will be urged against the bottom of plate 21, so that ring 19″, flap 26 and ring 27 jointly prevent sealing liquid or gas from escaping through the clearance 20 between plates 21 and 22.

Figure 5:
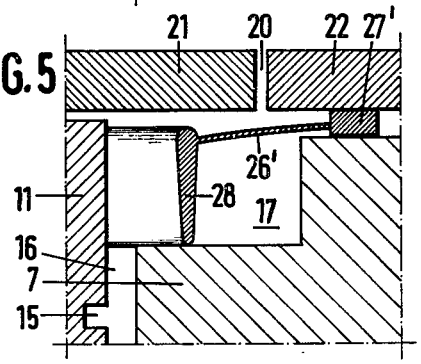
FIG. 5 shows, in a manner similar to FIG. 4, a bushing including a further embodiment of the sealing member.

FIG. 5 shows yet another embodiment of the sealing member. This embodiment includes a solid caisson ring or annular member 28 of a suitable sealing material, for example rubber. Ring 28 is provided with a radially outwardly projecting flap 26′ adjacent its top, which flap 26′ has its outer circumference connected to a ring 27′. Ring 27′ is clamped between plate 22 and member 7. In the rest condition of the device, liquid will move upwards through the small clearance to enter into the space or chamber 17. Gas present under the annular flap 26′ cannot escape and will be compressed by the liquid. As a result, flap 26′ and hence ring 28 are urged upwards so that the top surface of ring 28 is urged against the bottom of plate 21. In this manner it is achieved again that no liquid can reach and escape through the small clearance 20 between plates 21 and 22.

I claim:

1. A sealing bushing for a member rotatable about a vertical axis and extending through a wall of a housing, said bushing including a fixed sleeve connected to the wall; a shaft of the rotatable member, the fixed sleeve concentrically surrounding said shaft; a rotatable sleeve having its upper end fixedly connected to said shaft and being concentrically received in said fixed sleeve, the connection between the upper end of the rotatable sleeve and said shaft being impermeable to liquid and gas, and the outer circumference of the rotatable sleeve connected to the shaft and the inner circumference of the fixed sleeve connected to the wall being dimensioned to define a small radial clearance between them; and means for maintaining a sealing liquid under pressure to a desired level in said small clearance during the rotation of said member, wherein the improvement comprises:

an annular chamber defined between the rotatable sleeve and the fixed sleeve adjacent the upper end of said small clearance;

a movable sealing member positioned in said space; and a second small clearance above said chamber between the rotatable sleeve connected to the shaft and the wall of the housing, which second clearance can be sealed by said movable sealing member.

2. A bushing according to claim 1, wherein said sealing member comprises a flat, annular flap of a flexible sealing material, which flap has its outer circumference sealingly connected between or to the wall of the housing and the fixed sleeve connected thereto, and a sealing ring sealed to the inner circumference of said flap and movable upward into contact with a surface of said chamber located radially inward from said second small clearance.

3. A bushing according to claim 2, wherein the material of said annular flap and said sealing ring comprises rubber.

4. A bushing according to claim 2 or 3, wherein said sealing member further comprises a stiff caisson ring sealed adjacent its upper edge to the inner circumference of the flap, said caisson ring forming in conjunction with said flap a hollow annular space, open at the bottom, between the caisson ring and the outer wall of the chamber for trapping gas if sealing liquid is forced upward into the chamber, the pressure of said trapped gas being sufficient to raise the sealing ring into contact with said surface of the chamber if the sealing liquid reaches above a predetermined level in the chamber.

5. A bushing according to claim 4, wherein said sealing ring and said caisson ring are integrally molded from an elastomeric material.

6. A bushing according to claim 1, wherein said movable sealing member comprises a circular inner wall radially spaced from the rotatable sleeve and an upward-facing annular sealing surface having an inner diameter at least as great as the diameter of said inner wall, the sealing member being movable in a vertical direction between a lower normal operating position in which the sealing member makes no contact with the rotatable sleeve and an upper sealing position in which the sealing surface makes mating contact with a surface of the rotatable member, so that no wear of the sealing surface against the rotatable member occurs when the sealing member is not in the upper sealing position.

7. A bushing according to claim 1, wherein said sealing member comprises a structure adapted to be buoyantly raised from a lower normal operating position to an upper sealing position in the event that sealing liquid which is maintained to a desired level in said small clearance during normal operation should rise up into said annular chamber.

8. A bushing according to claim 7, wherein said sealing member contacts the rotary member only when the sealing member is in the upper sealing position.

9. A bushing according to claim 7 or 8, wherein said annular chamber has a bottom surface formed in the fixed sleeve, and said sealing member rests on said bottom surface when in the lower normal operating position.

* * * * *

UNITED STATES PATENT AND TRADEMARK OFFICE
CERTIFICATE OF CORRECTION

PATENT NO. : 4,236,721
DATED : December 2, 1980
INVENTOR(S) : Theodorus A.F. Pennock It is certified that error appears in the above—identified patent and that said Letters Patent is hereby corrected as shown below:

Col. 1, line 14, after "the" insert --rotatable--.

Col. 4, line 25, change "19" to --19'--.

Signed and Sealed this

Seventh Day of April 1981

[SEAL]

Attest:

RENE D. TEGTMEYER

Attesting Officer     Acting Commissioner of Patents and Trademarks